Patented May 4, 1948

2,440,760

UNITED STATES PATENT OFFICE 2,440,760

PROCESS FOR PRODUCTION OF 1-AMINO-2-SULFO-4-BROM-ANTHRAQUINONE

George W. Seymour, Victor S. Salvin, and Walter R. Edwards, Cumberland, Md., assignors to Celanese Corporation of America, a corporation of Delaware No Drawing. Application September 13, 1944, Serial No. 553,960

4 Claims. (Cl. 260—371)

This invention relates to dyestuff intermediates and relates more particularly to an improved process for the production of 1-amino-2-sulfo-4-brom-anthraquinone.

An object of this invention is to provide an improved process for the production of 1-amino-2-sulfo-4-brom-anthraquinone of increased purity and in improved yield.

Other objects of this invention will appear from the following detailed description.

The dyestuff intermediate 1-amino-2-sulfo-4-brom-anthraquinone finds important use as a raw material for the production of certain anthraquinone dyestuffs of improved fastness to light and to acid fading. This dyestuff intermediate is normally prepared by brominating 1-amino - 2 - sulfo - anthraquinone. In processes heretofore employed for the preparation of this compound certain side reactions took place rather freely, resulting in the formation of excessive quantities of impurities such as 1-hydroxy-2-sulfo-4-brom-anthraquinone and 1-amino-2,4-dibrom-anthraquinone. These impurities reduce the yield of the desired intermediate and their presence seriously interferes with the production of dyestuffs of consistently satisfactory purity and fastness properties from the valuable 1-amino - 2 - sulfo - 4 - brom-anthraquinone intermediate.

We have now discovered that 1-amino-2-sulfo-4-brom-anthraquinone may be prepared in increased purity and improved yield from 1-amino-2-sulfo-anthraquinone by a novel bromination procedure. In accordance with the process of our invention, these advantages are achieved if 1-amino-2-sulfo-anthraquinone is brominated in aqueous acid solution at a relatively low temperature while maintaining a salt concentration in the solution just high enough to cause the 1-amino-2-sulfo-4-brom-anthraquinone to precipitate from solution as it is formed without precipitating the unreacted 1-amino-2-sulfo-anthraquinone. By causing the 1 - amino - 2 - sulfo-4-brom-anthraquinone to precipitate as formed, side reactions are minimized and a maximum yield of the desired brominated intermediate is obtained. The 1-amino-2-sulfo-4-brom-anthraquinone obtained in accordance with our process is of very high purity and yields of over 85% may be consistently obtained.

The concentration of the 1-amino-2-sulfo-anthraquinone in the aqueous solution during bromination is preferably from about 2 to 4% by weight, but optimum results are achieved during bromination employing an aqueous solution of 1-amino-2-sulfo-anthraquinone in a concentration of about 2.5%. Bromination is effected by adding bromine in the form of a solution in dilute hydrochloric acid to the aqueous solution of 1-amino-2-sulfo-anthraquinone. The bromine is preferably added as a 10% solution in aqueous hydrochloric acid of 15 to 20% concentration. The addition of a 10% molar excess of bromine is usually sufficient to make up any loss because of any dibromination which takes place.

The temperature during bromination may be held at from −2 to 2° C. but optimum results are achieved if bromination is effected at about 0°C.

To ensure immediate precipitation of the 1-amino-2-sulfo-4-brom-anthraquinone as formed and to avoid the side reactions which form undesired by-products, the salt concentration and the acidity of the solution must be closely controlled. Salts which may be employed, for example, are sodium chloride, potassium chloride or sodium sulfate, but we prefer to employ sodium chloride as the salting out agent. Thus, when brominating at 0° C. the concentration of the sodium chloride should be maintained at about 2% on the weight of the reaction mixture, while the concentration of mineral acid during bromination, which acid is preferably hydrochloric acid, should be about 2 to 4% by weight. Sulfuric acid may also be employed to maintain the desired acidity. Increased salt concentration tends to cause precipitation of unreacted 1-amino-2-sulfo-anthraquinone which is, of course, quite undesirable. Furthermore, by maintaining the acid concentration within the above limits the tendency of the bromine to oxidize the amino group to the hydroxy group with the resultant formation of 1-hydroxy-2-sulfo-4-brom-anthraquinone is greatly minimized.

After the addition of the desired quantity of the acid solution of bromine to the cooled aqueous solution of 1 - amino - 2 - sulfo - anthraquinone, which addition is usually effected over the course of 5 to 8 hours, the reaction is allowed to continue with agitation until all the bromine present has reacted completely, the temperature being maintained at −2 to 2° C. during reaction. This point, i. e. complete reaction, is usually reached after about one hour when a test for bromine should be negative. The entire reaction mixture is then added to an approximately equal volume of hot water and the whole is heated to 80 to 90° C. to dissolve the precipitated 1-amino-2-sulfo-4-brom-anthraquinone and leave undissolved any 1-amino-2,4-dibrom-anthraquinone which has formed. The latter is removed by filtration. The salt concentration of the filtrate is brought up to 4 to 5% by the addition of further quantities of salt, preferably to about 5%, the acid concentration is adjusted to a concentration of 2 to 3%, preferably 2%, and the solution is cooled. On cooling the desired intermediate 1-amino-2-sulfo-4-brom-anthraquinone is selectively precipitated and may be filtered from solution. Any unreacted 1-amino-2-sulfo-anthraquinone may be salted out of the filtrate and recycled in the process.

In order further to illustrate our invention, but without being limited thereto, the following example is given:

*Example*

100 parts by weight of pure 1-amino-2-sulfo-anthraquinone are dissolved in 4000 parts by weight of water at a temperature of 80° C. and the hot solution is filtered to remove insoluble matter. To this 2.5% solution of 1-amino-2-sulfo-anthraquinone are added 80 parts by weight of sodium chloride to make the salt concentration 2%, and then 254 parts by weight of hydrochloric acid (sp. grav. 1.18) are added and the whole cooled with stirring to 0° C.

The bromine solution for bromination is prepared by adding 54 parts by weight of bromine to a solution of 241 parts by weight of hydrochloric acid (sp. grav. 1.18) in 236 parts by weight of water with agitation and when the bromine addition is completed the solution is cooled to 0° C. Bromination is effected by adding the aqueous hydrochloric acid solution of bromine to the cooled solution of 1 - amino - 2 - sulfo - anthraquinone over the course of five hours. During the addition of the bromine, the 1-amino-2-sulfo-4-brom-anthraquinone precipitates from solution as it is formed. After all of the bromine has been added, the reaction is allowed to continue for one hour with stirring at 0° C. At this point a test for bromine should be negative.

The reaction mixture is then poured into 4650 parts by weight of water at 25° C. and the whole is heated to 80 C. Solution is complete except for any 1 - amino - 2,4-dibrom - anthraquinone formed. The latter is filtered off, washed with 500 parts by weight of water at 80° C. and the filtrates are combined.

The desired intermediate 1-amino-2-sulfo-4-brom-anthraquinone is precipitated from the combined filtrates by adding 400 parts by weight of sodium chloride and 153 parts by weight of hydrochloric acid (sp. grav. 1.18) thereto and cooling the solution obtained. The concentration of sodium chloride in the solution during precipitation is 5% while the hydrochloric acid concentration is 2%. The 1-amino-2-sulfo-4-brom-anthraquinone precipitates as a flocculent precipitate during cooling and is filtered off and washed with about 1000 parts by weight of neutral 4% sodium chloride solution.

Unreacted 1 - amino - 2 - sulfo-anthraquinone may be recovered from the combined filtrate and wash liquor by adding 1620 parts by weight of sodium chloride thereto and salting the 1-amino-2-sulfo-anthraquinone from solution. This compound may then be recycled in the process. An overall yield of 83 to 86% of 1-amino-2-sulfo-4-brom-anthraquinone is obtained after recycling the unreacted 1-amino-2-sulfo-anthraquinone.

Our novel process enables 1-amino-2-sulfo-4-brom-anthraquinone to be obtained in improved yield and in a high state of purity thus enabling dyestuffs of consistently satisfactory color value and fastness properties to be obtained therefrom.

It is to be understood that the foregoing detailed description is given merely by way of illustration and that many variations may be made therein without departing from the spirit of our invention.

Having described our invention, what we desire to secure by Letters Patent is:

1. Process for the production of 1-amino-2-sulfo-4-brom-anthraquinone, which comprises brominating with a solution of bromine in aqueous mineral acid 1-amino-2-sulfo-anthraquinone dissolved in an aqueous mineral acid solution containing an inorganic salt, the concentration of said mineral acid being maintained, during bromination, at 2 to 4% by weight of the reaction mixture and that of said inorganic salt at 2 to 3% by weight of the reaction mixture, and the bromination reaction being carried out at a temperature of −2 to 2° C., whereby the 1-amino-2-sulfo-4-brom-anthraquinone as formed is precipitated from solution.

2. Process for the production of 1-amino-2-sulfo-4-brom-anthraquinone, which comprises brominating with a solution of bromine in aqueous hydrochloric acid 1-amino-2-sulfo-anthraquinone dissolved in an aqueous hydrochloric acid solution containing sodium chloride, the concentration of said hydrochloric acid being maintained, during bromination, at 2 to 4% by weight of the reaction mixture and that of said sodium chloride at 2 to 3% by weight of the reaction mixture, and the bromination reaction being carried out at a temperature of −2 to 2° C., whereby the 1-amino-2-sulfo-4-brom-anthraquinone as formed is precipitated from solution.

3. Process for the production of 1-amino-2-sulfo-4-brom-anthraquinone, which comprises brominating with a solution of bromine in aqueous hydrochloric acid 1-amino-2-sulfo-anthraquinone dissolved in an aqueous hydrochloric acid solution containing sodium chloride, the concentration of said 1-amino-2-sulfo-anthraquinone being about 2 to 4% by weight and the concentration of said hydrochloric acid being maintained, during bromination, at 2 to 4% by weight of the reaction mixture and that of said sodium chloride at 2 to 3% by weight of the reaction mixture, and the bromination reaction being carried out at a temperature of −2 to 2° C., whereby the 1-amino-2-sulfo-4-brom-anthraquinone as formed is precipitated from solution.

4. Process for the production of 1-amino-2-sulfo-4-brom-anthraquinone, which comprises brominating with a solution of bromine in aqueous hydrochloric acid 1-amino-2-sulfo-anthraquinone dissolved in an aqueous hydrochloric acid solution containing sodium chloride, the concentration of said 1-amino-2-sulfo-anthraquinone being about 2 to 4% by weight and the concentration of said hydrochloric acid being maintained, during bromination, at 2 to 4% by weight of the reaction mixture and that of said sodium chloride at 2 to 3% by weight of the reaction mixture, and the bromination reaction being carried out at a temperature of −2 to 2° C., whereby the 1-amino-2-sulfo-4-brom-anthraquinone as formed is precipitated from solution, diluting the solution with water and heating to dissolve the precipitated 1-amino-2-sulfo-4-brom-anthraquinone filtering off undissolved material, adding sodium chloride to the hot filtrate, cooling to precipitate the 1-amino-2-sulfo-4-brom-anthraquinone and separating the precipitate from the liquid.

GEORGE W. SEYMOUR,
VICTOR S. SALVIN,
WALTER R. EDWARDS.

REFERENCES CITED

The following references are of record in the file of this patent:

UNITED STATES PATENTS

| Number | Name | Date |
|---|---|---|
| 2,336,893 | Scott | Dec. 14, 1943 |

FOREIGN PATENTS

| Number | Country | Date |
|---|---|---|
| 5,459 | Great Britain | 1900 |
| 146,691 | Germany | Nov. 9, 1903 |
| 263,395 | Germany | Aug. 9, 1913 |